Jan. 5, 1971   W. MANDLER   3,552,819
ILLUMINATED RETICLE FOR OPTICAL VIEWING INSTRUMENTS
Filed Nov. 6, 1967   2 Sheets-Sheet 1

INVENTOR
Walter Mandler
BY
Krafft & Wells
ATTORNEYS

3,552,819
ILLUMINATED RETICLE FOR OPTICAL VIEWING INSTRUMENTS

Walter Mandler, Midland, Ontario, Canada, assignor to Ernst Leitz GmbH, Wetzlar, Germany
Filed Nov. 6, 1967, Ser. No. 680,835
Claims priority, application Germany, Nov. 10, 1966, L 55,022
Int. Cl. G02f 27/32
U.S. Cl. 350—10      5 Claims

ABSTRACT OF THE DISCLOSURE

In an optical viewing instrument comprising at least one mirror surface on which an intermediate image is formed and more particularly in a catoptric gun sight a reticle is produced on said mirror surface by removing the reflective coating in appropriate shape. Behind the mirror a light source is arranged for illumination of said reticle and means are provided adapted to adjust the intensity of said illumination to the brightness of the object to be observed.

CROSS-REFERENCE TO RELATED APPLICATIONS

Applicant claims priority under 35 U.S.C. 119 for application Nr. L 55,022, filed Nov. 10, 1966 in the Patent Office of the Federal Republic of Germany.

BACKGROUND OF THE INVENTION

(1) Field of the invention

The present invention relates to optical viewing instruments comprising at least one mirror surface. More particularly, the invention pertains to catoptric gun sights.

(2) Description of the prior art

In instruments of the above described nature it is well known to those skilled in the art to produce an intermediate image of the object on a mirror surface and also to arrange a reticle on the same surface. If this reticle is of the non-illuminated type the marks or pattern of the reticle appear as a black silhouette against the background being viewed. With this type of reticle it is very difficult, if not impossible, to take aim at the target in dim light conditions or at night.

This difficulty can readily be overcome by illuminating the reticle, as is well known in the art. The marks of the reticle will then appear bright against the dim or dark background. This, however, has the disadvantage that in bright daylight the contrast between background and reticle is only very flat. Moreover, reticles of the illuminated type have up to now been produced by etching a glass plate and by illuminating the marks on the plate from the side. Since with this method, however, only scattered radiation reaches the observer's eye, powerful light sources have to be used which require a rather bulky electrical supply.

SUMMARY OF THE INVENTION

It is therefore an object of the invention to provide an illuminated reticle in optical instruments comprising at least one mirror surface which needs only a weak light source and therefore only little electrical equipment.

It is a further object of the invention to provide a reticle which can be illuminated by available light and can thus dispense with artificial light sources.

It is another object of the invention to provide an illuminated reticle the brightness of which can be adjusted to the light conditions prevailing in the field to be viewed.

According to the invention these objects are achieved by producing the reticle marks on the mirror surface on which the intermediate object image is formed by partially removing the reflective coating and further by disposing a light source behind said mirror in the viewing direction. Since the light trays emitted by the light source impinge directly on the observer's eye the source can be rather faint. Consequently, if an artificial light source is employed the latter will require only small dimension electrical equipment. The light source may, for example, consist of an incandescent light, however, it may also consist of a gas discharge lamp or of a radioactive gas such as tritium which stimulates a fluorescent coating of the reticle. On the other hand, if the light source makes use of available light, for example by means of a prism or a mirror, as will hereinafter be described in more detail, a rather low light intensity will suffice for illuminating purposes.

Further, for adjusting the brightness of the reticle to the light conditions of the target background filter means are disposed between the light source and the reticle. Said filter means may for example be a neutral wedge. If, however, a light bulb is used as the light source, a variable resistor may be employed in the electrical circuit for adjusting purposes.

DESCRIPTION OF THE DRAWINGS

Additional features of the invention will be apparent from the following description when taken in conjunction with the accompanying drawings, wherein.

DESCRIPTION OF THE PREFERRED EMBODIMENT

Figure 1:
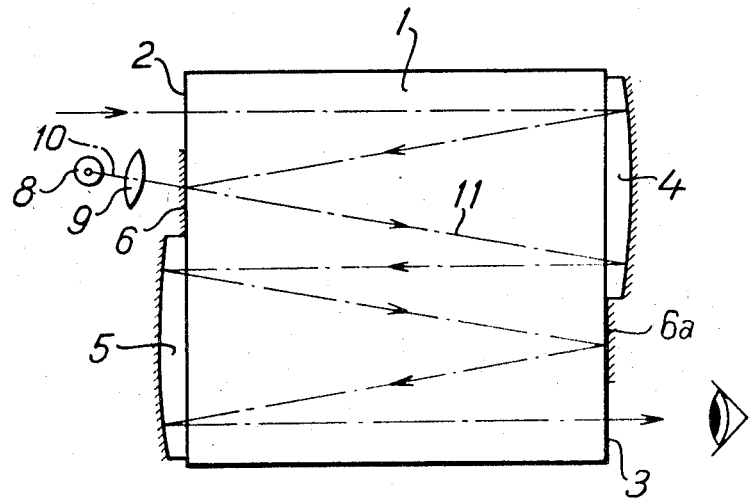
FIG. 1 shows schematically a catoptric gun sight wherein an intermediate image of the object is formed on one mirror surface.

Referring to the drawings and especially to FIG. 1 the glass body 1 of the telescope is provided with plane-parallel surfaces 2 and 3. Two planoconvex lenses 4 and 5 are cemented to said surfaces, said lenses serving as the objective and the ocular of the telescope.

Two portions 6, 6a of the plane-parallel surfaces are coated with a reflective layer by which the observation beam is adequately reflected.

Figure 2:
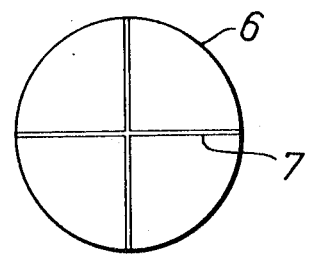
FIG. 2 shows by way of example the shape of the reticle.

One of said mirrors, more particularly on mirror 6, an intermediate image of the observed object is formed by objective 4. Said mirror 6 is also provided with the reticle 7 which has been produced by removing the reflective coating in cross-like shape as illustrated in FIG. 2.

According to the invention a light source is disposed behind the mirror 6 in the direction of observation. As shown by FIG. 1 this light source may consist of an artificial light source, i.e. light bulb 8 in combination with lens 9. The light source illuminates the reticle 7. Owing to the novel arrangement of the light source in direct extension 10 of the observation beam 11 beyond mirror 6 the light rays emitted by bulb 8 impinge directly on the observer's eye. Consequently, only a rather low-powered bulb is needed.

Figure 3:
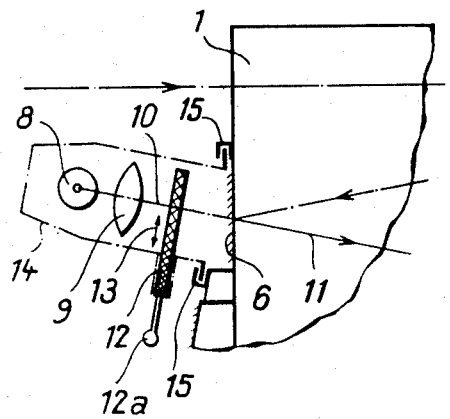
FIGS. 3 and 4 are illustrations of means adapted to adjust the brightness of the light source according to the brightness of the object to be viewed, inserted between an artificial light source and the recticle.

For adjustment of the brightness of reticle 7 to the light conditions in the field to be viewed filter means may be employed as illustrated in FIG. 3. Light bulb 8 and lens 9 are arranged in a housing 14 which is attached to the glass body 1 by suitable coupling means 15. A neutral wedge 12 is disposed between lens 9 and mirror 6 and means 12a are provided for displacing wedge 12 perpendicular to extension 10.

Figure 4:
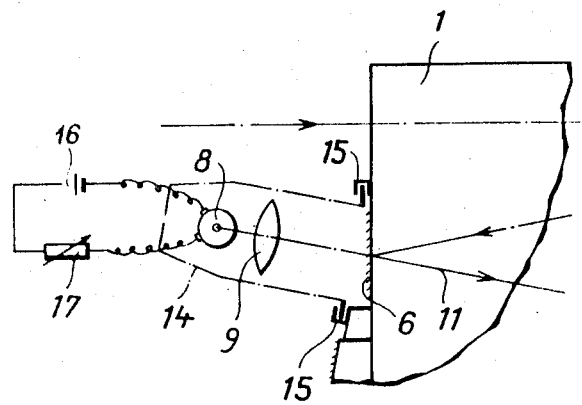

Adjusting the brightness of the light source can also be accomplished by varying the voltage in the electrical circuit. As shown in FIG. 4 the light bulb 8 is in line connected to the battery 16 and the variable resistor 17 by which the voltage may be controlled.

Figure 5:
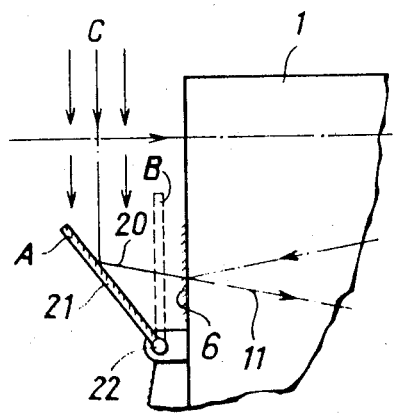
FIG. 5 shows schematically means adapted to utilize available light for illumination purposes.

In FIG. 5 an embodiment of the invention is depicted wherein available light is used for illuminating reticle 7. By means of a stud 22 a mirror 21 is hinged on glass body 1, which mirror 21 is capable of assuming two positions A and B. While in position A mirror 21 reflects the available light rays impinging from the direction C towards the reticle. This position is preferably to be used in dim light conditions. The light still available from the outside will cause the reticle to appear bright against a dark background. Position B, on the other hand, is to be used in daylight. In this position the mirror 21 covers mirror 6 from the outside and prevents light from reaching the reticle. The latter will thus appear black against a bright background.

Although the reticle and the illumination means have been described in detail for purposes of illustration and disclosure of the invention as applied to a gun sight it will readily be understood that the reticle and the illumination means of the invention are equally applicable to other optical viewing instruments wherein an intermediate image of an object is formed on a mirror.

What I claim is:

1. An optical viewing instrument having an observation beam (11) and comprising in combination, first (4) and second (5) concave mirrors having major axes offset from each other and in parallel relationship, portions of said concave mirrors overlapping each other, first (6) and second (6a) plane mirrors having reflective coatings thereon at the overlapping edges to reverse the direction of said observation beam, reflected by said concave mirrors, a reticle (7) on one of said plane mirrors defined by the removal of said reflective coating, and a condenser system having a light source and a collecting member behind said reticle located in the prolongated axis of the reflected part of said observation beam.

2. An optical viewing instrument according to claim 1, wherein said light source consists of an artificial light source (8).

3. An optical viewing instrument according to claim 2 and further comprising means (12, 17) adapted to adjust the brightness of the light source (8) according to the brightness of the object to be viewed.

4. An optical viewing instrument according to claim 3, wherein said means adapted to adjust the brightness of said light source (8) consists of a displaceable neutral wedge (12) inserted in the path of rays between said light source (8) and said reticle (7).

5. An optical viewing instrument according to claim 3, wherein said means adapted to adjust the brightness of said light source (8) consists of a variable resistor (17) in the electrical circuit of said artificial light source (8).

References Cited

UNITED STATES PATENTS

| | | | |
|---|---|---|---|
| 2,083,313 | 6/1937 | Cardoza | 350—141 |
| 2,377,064 | 5/1945 | Aufiero | 350—10UX |
| 2,377,109 | 5/1945 | Schwartz et al. | 350—141 |
| 2,476,340 | 7/1949 | Wallhausen | 33—50.5X |
| 2,867,151 | 1/1959 | Mandler | 350—10 |
| 3,230,627 | 1/1966 | Rickert et al. | 350—10X |
| 1,931,552 | 10/1933 | Maris | 350—10X |

DAVID SCHONBERG, Primary Examiner

T. H. KUSMER, Assistant Examiner

U.S. Cl. X.R.

33—50.5; 350—55, 266